(12) United States Patent
Tanygin

(10) Patent No.: US 6,859,769 B1
(45) Date of Patent: Feb. 22, 2005

(54) METHOD AND APPARATUS FOR CREATING ELEMENTS AND SYSTEMS FOR DESCRIPTION OF POSITION AND MOTION OF BODIES IN THREE-DIMENSIONAL SPACE TO SUPPORT ORBITAL MANEUVER ANALYSIS

(75) Inventor: Sergei Tanygin, Thorndale, PA (US)

(73) Assignee: Analytical Graphics, Inc., Malvern, PA (US)

( * ) Notice: Subject to any disclaimer, the term of this patent is extended or adjusted under 35 U.S.C. 154(b) by 0 days.

(21) Appl. No.: 09/491,864

(22) Filed: Jan. 26, 2000

Related U.S. Application Data

(60) Provisional application No. 60/117,183, filed on Jan. 26, 1999.

(51) Int. Cl.$^7$ ................................................. G06G 7/48
(52) U.S. Cl. ..................... 703/8; 703/6; 703/2; 701/13; 701/222; 701/226
(58) Field of Search ..................... 701/226, 13; 703/22, 703/8

(56) References Cited

U.S. PATENT DOCUMENTS

| | | | | |
|---|---|---|---|---|
| 5,109,346 A | * | 4/1992 | Wertz | 701/226 |
| 5,267,167 A | * | 11/1993 | Glickman | 701/226 |
| 5,461,711 A | * | 10/1995 | Wang et al. | 345/720 |
| 5,528,502 A | * | 6/1996 | Wertz | 701/226 |
| 5,581,665 A | * | 12/1996 | Sugiura et al. | 700/251 |
| 5,717,848 A | * | 2/1998 | Watanabe et al. | 345/474 |
| 5,828,770 A | * | 10/1998 | Leis et al. | 382/103 |
| 5,852,792 A | * | 12/1998 | Nielson | 701/222 |
| 5,855,341 A | * | 1/1999 | Aoki et al. | 244/176 |
| 5,963,167 A | * | 10/1999 | Lichten et al. | 342/357.06 |
| 6,044,306 A | * | 3/2000 | Shapiro et al. | 700/90 |
| 6,085,128 A | * | 7/2000 | Middour et al. | 701/13 |
| 6,089,507 A | * | 7/2000 | Parvez et al. | 244/158 R |
| 6,102,334 A | * | 8/2000 | Claffey et al. | 244/158 R |
| 6,144,334 A | * | 11/2000 | Claffey et al. | 342/352 |
| 6,233,507 B1 | * | 5/2001 | May | 701/13 |
| 6,401,102 B1 | * | 6/2002 | Ishii et al. | 707/104.1 |
| 6,470,287 B1 | * | 10/2002 | Smartt | 702/102 |

OTHER PUBLICATIONS

"Modeling Orbiting and Rotating Bodies Using VRML", H.A. Lilly, Alabama School of Mathematics and Science, IEEE 1998.*

Space System Visualization and Analysis Using The Satellite Orbit Analysis Program (SOAP), D. Stodden, IEEE 0–7803–2473 0/95, IEEE 1995.*

"Building Geo–Specific Applications on Top of Geo Tool-Kit: a Case Study of Data Integration", O. Balovnev, Proceedings 10th In Conference on Scientific and Statistical Database Management, pp. 260–268, Jul. 1998.*

From GeoStore to GeoToolKit: The Second Step, O. Balovnev, University of Bonn, German Research Foundation, Jul. 1997.*

Getting Started with the STK Software Suite, STK Version 5.0, Analytical Graphics Inc.*

* cited by examiner

Primary Examiner—Jean R. Homere
Assistant Examiner—Fred Ferris
(74) Attorney, Agent, or Firm—Robers, Abokhair & Mardula, LLC

(57) ABSTRACT

The present invention provides a graphical user interface and software architecture that empowers the user to create new vectors, axes, points, coordinate systems, and other elements, and combinations thereof. The explicit means of creating coordinate systems and primitives are carried out via user input, imported data from files, or any other means of supplying numerical data to computer programs. In addition to geometrical relationships, coordinate system definitions can describe rates of change in the primitives, thus providing additional ways to create vectors.

9 Claims, 7 Drawing Sheets

METHOD AND APPARATUS FOR CREATING ELEMENTS AND SYSTEMS FOR DESCRIPTION OF POSITION AND MOTION OF BODIES IN THREE-DIMENSIONAL SPACE TO SUPPORT ORBITAL MANEUVER ANALYSIS

RELATED APPLICATIONS

This application claims priority from U.S. provisional patent application No. 60/117,183, filed Jan. 26, 1999.

BACKGROUND OF THE INVENTION

1. Field of the Invention

This invention relates to analysis of spacecraft orbits, trajectories, and maneuvers. More specifically, the invention relates to the creation of vectors, axes, points, coordinate systems and other elements, and combinations thereof, to be used in describing the position and motion of objects in space for maneuver planning.

2. Background of the Invention

In the planning and analysis of spacecraft maneuvers, the creation of vectors, axes, points, coordinate systems and other elements and combinations thereof is required in order to describe the position and motion of rigid bodies in three-dimensional space (e.g., spacecraft orbits, trajectories, and maneuvers).

A coordinate system can itself be moving in space. It can also be attached to one or more bodies or be a solely mathematical quantity. Movements of a coordinate system can be described via functions, data files, or user input to a computer program. When a coordinate system must be created, the relationship of the new system to a pre-existing one is defined. There are many ways to define that relationship, but all must include the following: (1) a specification of how the origin of the new coordinate system is translated relative to the origin of the existing system, and (2) a specification of how the set of three orthogonal axes defining the orientation of the new system is rotated relative to the set of axes of the existing system.

This introduces two important coordinate concepts that are part of any coordinate system definition: (1) origin point, and (2) axes. Given a point in space (i.e., an "origin") and a set of axes oriented in space, one can create a coordinate system by combining the point and the axes.

If there is a plurality of points and axes, one can create any desired combination thereof, thus increasing the number of possible coordinate systems. Advantages of a system providing this capability include: (1) reusability of the coordinate points and axes, of which a limited amount can be used to create a great number of coordinate systems, and (2) improved accuracy where two or more coordinate systems share common points and/or axes, since shared components need only be defined once, thus minimizing the possibility of error in performing duplicative computations.

Another component useful in constructing a coordinate system is the vector. The vector relates to points and axes in a number of ways. A new point can be specified by a vector starting at a pre-defined point. A new vector can be defined on the basis of two existing points, starting and ending. A new set of orthogonal axes can be specified by using two non-parallel vectors. A new vector can be created by performing various vector operations (rotation about another vector, cross-product, negation, etc.). Thus, vectors, along with points and axes, provide useful building blocks for constructing new coordinate systems.

Existing programs require users to write new computer code whenever a new coordinate relationship is introduced. Alternatively, when a graphical user interface (GUI) is provided, the choices offered by the GUI are limited to a certain subset of the myriad possibilities, thus limiting the options available for the analyst.

Some existing programs require that all relationships of interest be hard-coded, whereas some require that only one relationship be hard-coded. For example, the Jet Propulsion Laboratory (JPL) distributes the SPICE toolkit that contains a set of functions to perform coordinate conversions. The conversions can be obtained between any two of the specified coordinate frames, with each new frame specified relative to some existing frame. Nevertheless, this is a laborious task, since the specification must be performed through a file. The JPL SPICE toolkit also lacks the ability to specify points or vectors, which are crucial building blocks for interrelating various coordinate systems.

Another existing program, the Navigator software module (a product of Analytical Graphics, Inc. of Malvern, Pa.), provides a GUI for constructing coordinate systems, but is limited in that it constructs coordinate axes alone. It is not capable of constructing vectors from points nor axes from vectors. Furthermore, the Navigator module cannot construct a coordinate system from a set of axes and a point. Finally, the Navigator module has no capability to account for coordinate systems that rotate with respect to each other.

Thus, what is needed is a scheme for a spacecraft maneuver analyst to specify relationships for new coordinate systems without the need to hard-code a software solution. What is also needed is a scheme for a spacecraft maneuver analyst to model orbital maneuver phenomena according to any of a myriad of possible coordinate systems without the need to hard-code a software solution.

SUMMARY OF THE INVENTION

It is an object of the present invention to provide a scheme for a spacecraft maneuver analyst to specify relationships for new coordinate systems without the need to hard-code a software solution.

It is a further object of the present invention to provide a scheme for a spacecraft maneuver analyst to model orbital maneuver phenomena according to any of a myriad of possible coordinate systems without the need to hard-code a software solution.

It is another object of the present invention to provide a method of creating new spatial objects based on pre-existing parent objects.

It is yet another object of the present invention to provide a computer system that is adapted to create new spatial objects based on pre-existing parent objects.

It is still another object of the present invention to provide a computer program product for enabling a computer system to create new spatial objects based on pre-existing parent objects.

It is a still further object of the present invention to provide a method of creating a desired target to based on a preexisting parent object and on information explicitly provided by a user.

It is another object of the present invention to provide a computer system that is adapted to create new spatial objects based on a preexisting parent object and on information explicitly provided by a user.

It is a further object of the present invention to provide a computer program product for enabling a computer system to create new spatial objects based on a pre-existing parent object and on information explicitly provided by a user.

Some of the above objects are obtained, according to the present invention, by a method of creating a desired target object based on one or more preexisting parent objects. The method includes performing a finding operation to find the target object in terms of each of the parent object, as well as performing a building operation to obtain a combined transformation based on the parent objects. The target object is created by the combined transformation of the parent objects.

Others of the above objects are obtained by a computer system implementing this method of creating a desired target object based on one or more pre-existing parent objects. Still others of the above objects are obtained by a computer program product embodying instructions that cause a computer to implement this method of creating a desired target object based on one or more preexisting parent objects.

Certain of the above objects are obtained, according to the present invention, by a method of creating a desired target object based on a preexisting parent object and on information explicitly provided by a user. The method includes performing a finding operation to find the target object in terms of the parent object, using the information explicitly provided by the user, to obtain a first transformation, as well as performing a finding operation to find the parent object with respect to the target object, to obtain a second transformation. Additionally, the method includes combining the first and second transformations to create the target object.

The present invention provides a GUI and software architecture that empowers the user to create new vectors, axes, points, coordinate systems, and other elements, and combinations thereof. The explicit means of creating coordinate systems and primitives are carried out via user input, imported data from files, or any other means of supplying numerical data to computer programs. In addition to geometrical relationships, coordinate system definitions can describe rates of change in the primitives, thus providing additional ways to create vectors.

DETAILED DESCRIPTION OF THE INVENTION

Figure 1A:
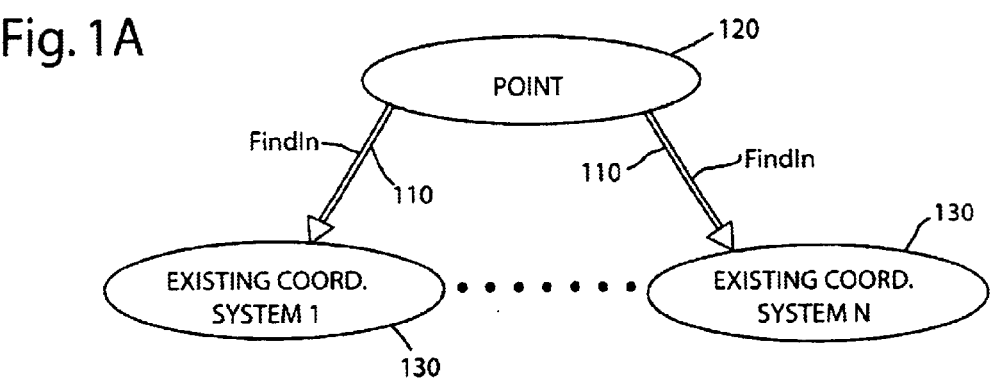
FIG. 1A illustrates a basic functional relationship between a point and coordinate system primitives.

In one embodiment, the invention relates to the creation of coordinate systems and primitives thereof in the context of a computer program for spacecraft mission analysis, such as the Astrogator module of the Satellite Tool Kit (STK) program developed by Analytical Graphics, Inc. of Malvern, Pa.

The present invention provides a GUI and software architecture that empowers the user to create new vectors, axes, points, coordinate systems, and other elements, and combinations thereof, in the following ways:

1) specifying a point explicitly relative to an existing coordinate system;
2) specifying a vector explicitly relative to an existing set of axes;
3) specifying a set of axes explicitly relative to an existing set of axes;
4) specifying a coordinate system explicitly relative to an existing coordinate system;
5) defining a point by an existing vector (i.e., the end point);
6) defining a vector by two points (i.e., start point and end point);
7) defining a vector by one or more existing vectors via vector operations (e.g., cross product);
8) defining a set of coordinate axes by two non-parallel vectors; and
9) defining a coordinate system as a combination of a point (origin) and a set of coordinate axes.

The explicit means of creating coordinate systems and primitives (items 1–4, above) are carried out via user input, imported data from files or any other means of supplying numerical data to computer programs. In addition to geometrical relationships, coordinate system definitions can describe rates of change in the primitives, thus providing additional ways to create vectors:

a. the rate of change of a vector constitutes another vector;
b. the rate of change of a point (i.e., its velocity) constitutes a vector; and
c. the rate of change of axes (rate of rotation or angular rate) constitutes a vector.

The present invention gives users the ability to introduce new coordinate primitives by both direct specification through user/file input, and by building them out of existing primitives at run-time through the interface. Coordinate primitives created by both methods can then be reused immediately as building blocks for creating more primitives. The amount of actual coding needed to create a wide range of useful primitives is reduced dramatically compared to conventional systems, creation may be performed at runtime, and manageability of the code is improved since correction made to one of the primitives is automatically inherited by all primitives using this block.

While the above description focuses on the use of the invention to create coordinate systems and primitives thereof, it is not intended that the invention be limited to this application. An aspect of the invention is its flexibility in allowing the user to define a variety of elements and combinations thereof for describing the position and movement of bodies in three-dimensional space.

Referring to FIGS. 1A–1D, the basic functional relationships among coordinate system primitives are represented. The function "FindIn" (represented by a double arrow in these Figs.) is a basic function used by the invention to find the object that calls it (i.e., the point, coordinate system, vector or set of axes in the upper ellipse in each Fig.) in any appropriate existing objects (the lower ellipses).

Referring to FIG. 1A, a basic functional relationship is illustrated between a point and coordinate system primitives. The basic FindIn function 110 is called by a point object 120 and finds that point object 120 in existing coordinate system objects 1 through N 130.

Figure 1C:
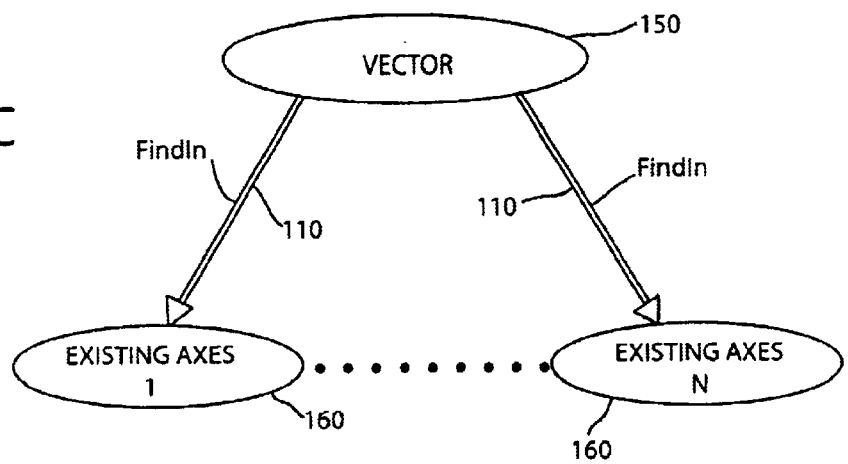
FIG. 1C illustrates a basic functional relationship between a vector and coordinate system primitives.
Figure 1B:
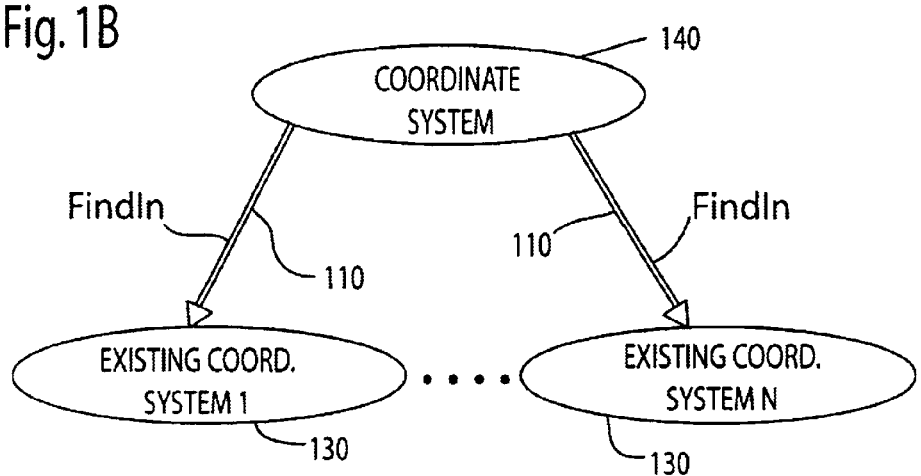
FIG. 1B illustrates a basic functional relationship between a coordinate system and coordinate system primitives.

Referring to FIG. 1B, a basic functional relationship is illustrated between a coordinate system and coordinate system primitives. The basic FindIn function 110 is called by a coordinate system object 140 and finds that coordinate system object 140 in existing coordinate system objects 1 through N 130.

Referring to FIG. 1C, a basic functional relationship is illustrated between a vector and coordinate system primitives. The basic FindIn function 110 is called by a vector object 150 to find that vector object 150 in existing axes objects 1 through N 160.

Figure 1D:
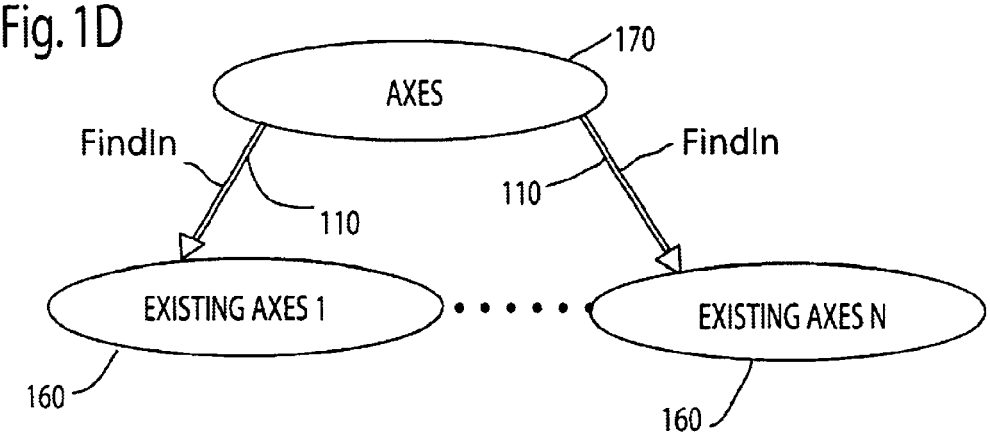
FIG. 1D illustrates a basic functional relationship between a set of axes and coordinate system primitives.

Referring to FIG. 1D, a basic functional relationship is illustrated between a set of axes and coordinate system primitives. The basic FindIn function 110 is called by an axes object 170 to find that axes object 170 in existing axes objects 1 through N 160.

Referring to FIGS. 2A–2D, the basic constructional relationships among coordinate system primitives are represented. In these figures, single arrows represent links between pre-existing objects (in the lower ellipses) and the object to be constructed (in the upper ellipse). The double arrows denote required explicit input from the user via the computer program's user interface, a data file, or another source. The words and symbols in square brackets describe the operations that must be performed on the data supplied by the linked objects. It should be noted that there must be a fundamental point and fundamental axes specified directly by the user. These must be defined independently of other objects, since they define the original coordinate system (i.e., the base of the universe). This definition by the user may be explicit, or it may be a tacit adoption of a default universe.

Figure 2A:
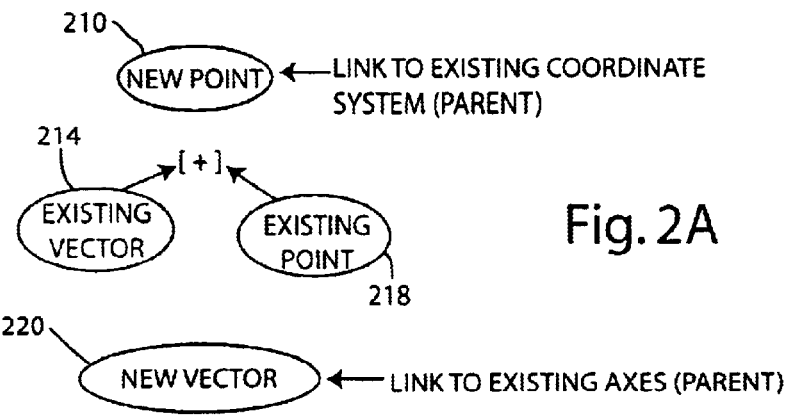
FIG. 2A illustrates basic constructional relationships between a new point and existing coordinate system primitives.

Referring to FIG. 2A, basic constructional relationships between a new point 210 and existing coordinate system primitives 214, 218 are illustrated. In this case, an existing vector 214 is combined with an existing point 218 to define a new point 210 in space. The user provides a link to an existing (parent) coordinate system.

Figure 2B:
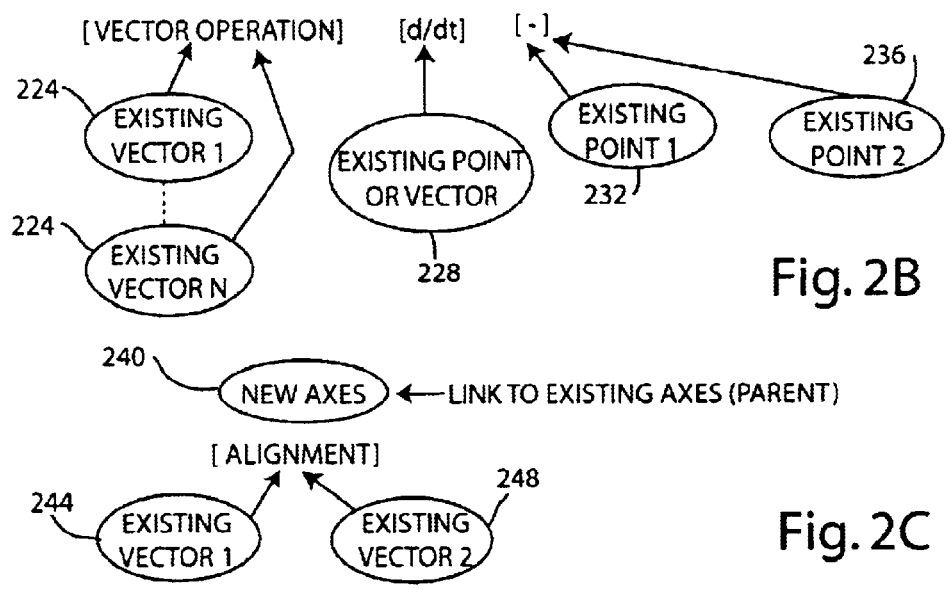
FIG. 2B illustrates basic constructional relationships between a new vector and existing coordinate system primitives.

Referring to FIG. 2B, basic constructional relationships between a new vector 220 and existing coordinate system primitives 224, 228, 232, 236 are illustrated. The new vector 220 may be defined by a vector operation taken on two or more existing vectors 224, chosen from existing vectors 1 through N 224. Alternatively, the new vector 220 may be defined by the first derivative of an existing point or vector 228. As yet another alternative, the new vector 220 may be defined based on the difference between two existing points 232, 236. In each case, the user provides a link to an existing (parent) set of axes.

Figure 2C:
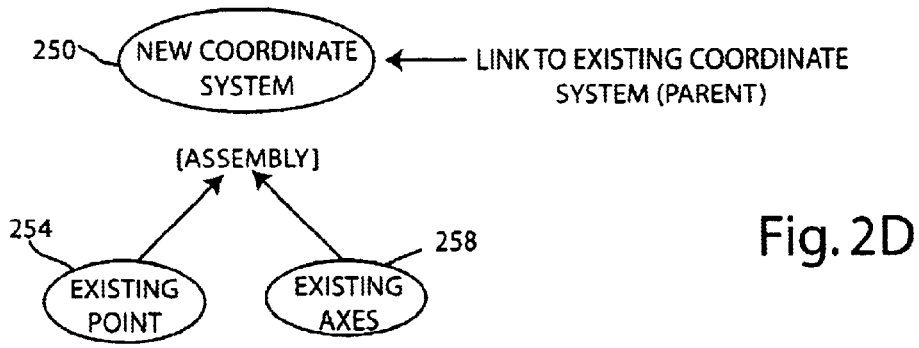
FIG. 2C illustrates basic constructional relationships between new axes and existing coordinate system primitives.

Referring to FIG. 2C, basic constructional relationships between new axes 240 and existing coordinate system primitives 244, 248 are illustrated. In this case, two existing vectors 244, 248 (which should be non-parallel) are aligned to define a new set of axes 240. The user provides a link to an existing (parent) set of axes.

Figure 2D:
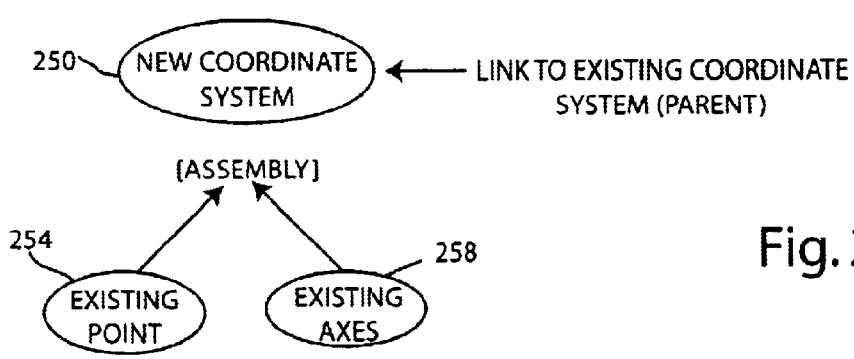
FIG. 2D illustrates basic constructional relationships between a new coordinate system and existing coordinate system primitives.

Referring to FIG. 2D, basic constructional relationships between a new coordinate system 250 and existing coordinate system primitives 254, 258 are illustrated. In this case, an existing point 254 and an existing set of axes 258 are assembled to define a new coordinate system 250. The user provides a link to an existing (parent) coordinate system.

Figure 3:
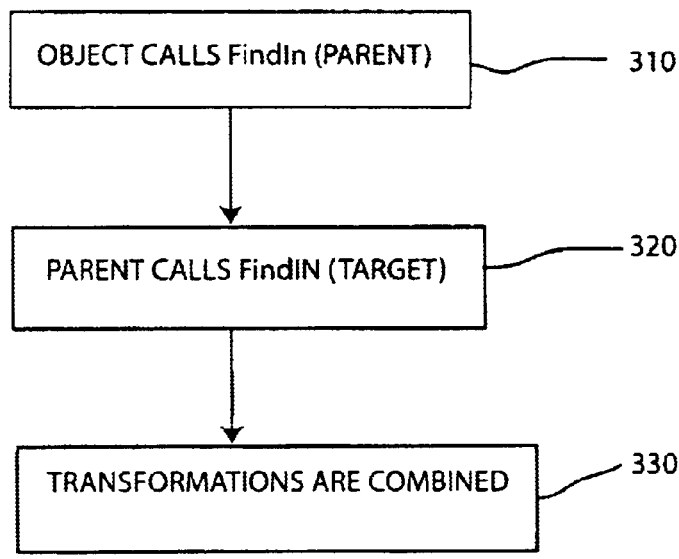
FIG. 3 illustrates a flow chart of a typical "FindIn" call

Referring to FIG. 3, a flow chart is shown of a FindIn call according to an embodiment of the present invention. In this case, involving explicit input, the object is first found in its Parent object 310, using the explicit information supplied by the user. Then the FindIn function is applied to the parent object 320, and the transformations obtained are combined 330.

Figure 4:
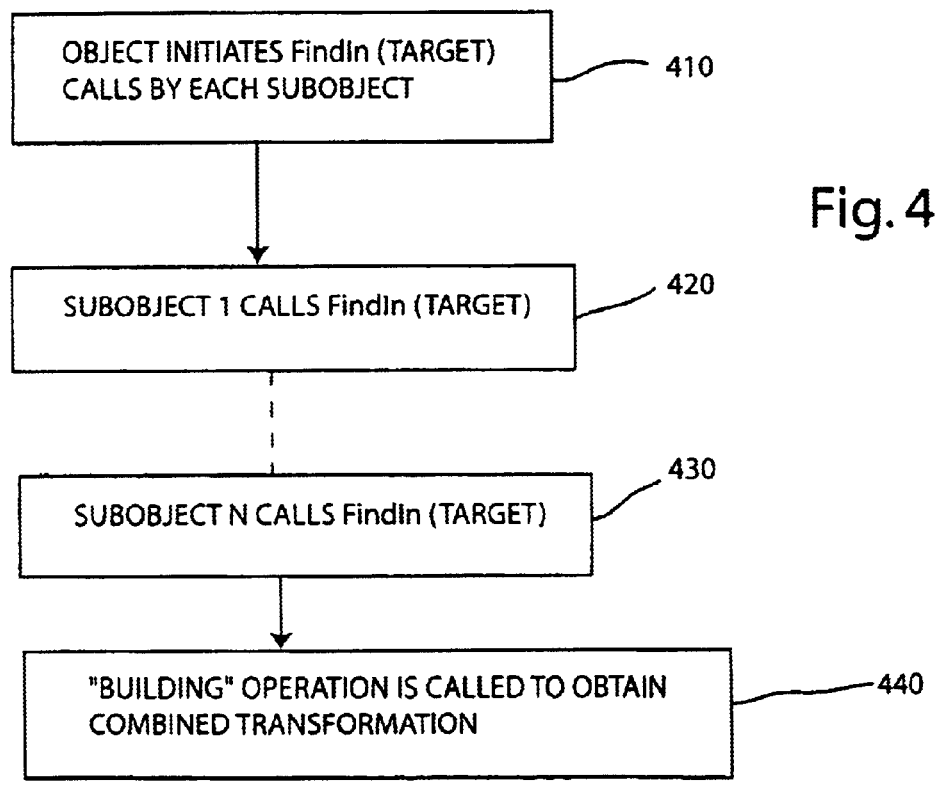
FIG. 4 illustrates a flow chart for the case in which an object is built from pre-existing (or previously constructed) objects.

Referring to FIG. 4, a flow chart is shown for the case in which an object is built from preexisting (or previously constructed) objects. In this case the target object initiates the FindIn function 410 for each of its sub-objects 420, 430. Then the required "building" operation (e.g., refer to the square brackets in FIG. 2) is called 440 to obtain the combined transformation.

Figure 5:
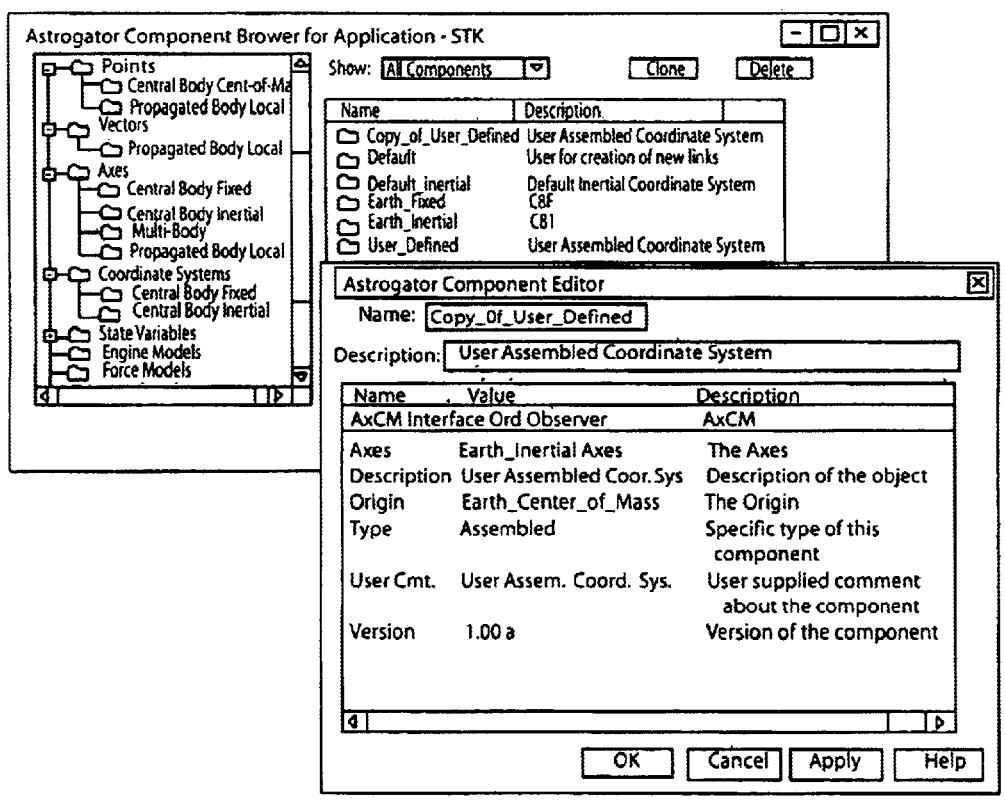
FIG. 5 illustrates a simple example of the invention implemented in conjunction with the Astrogator program.
Figure 6:
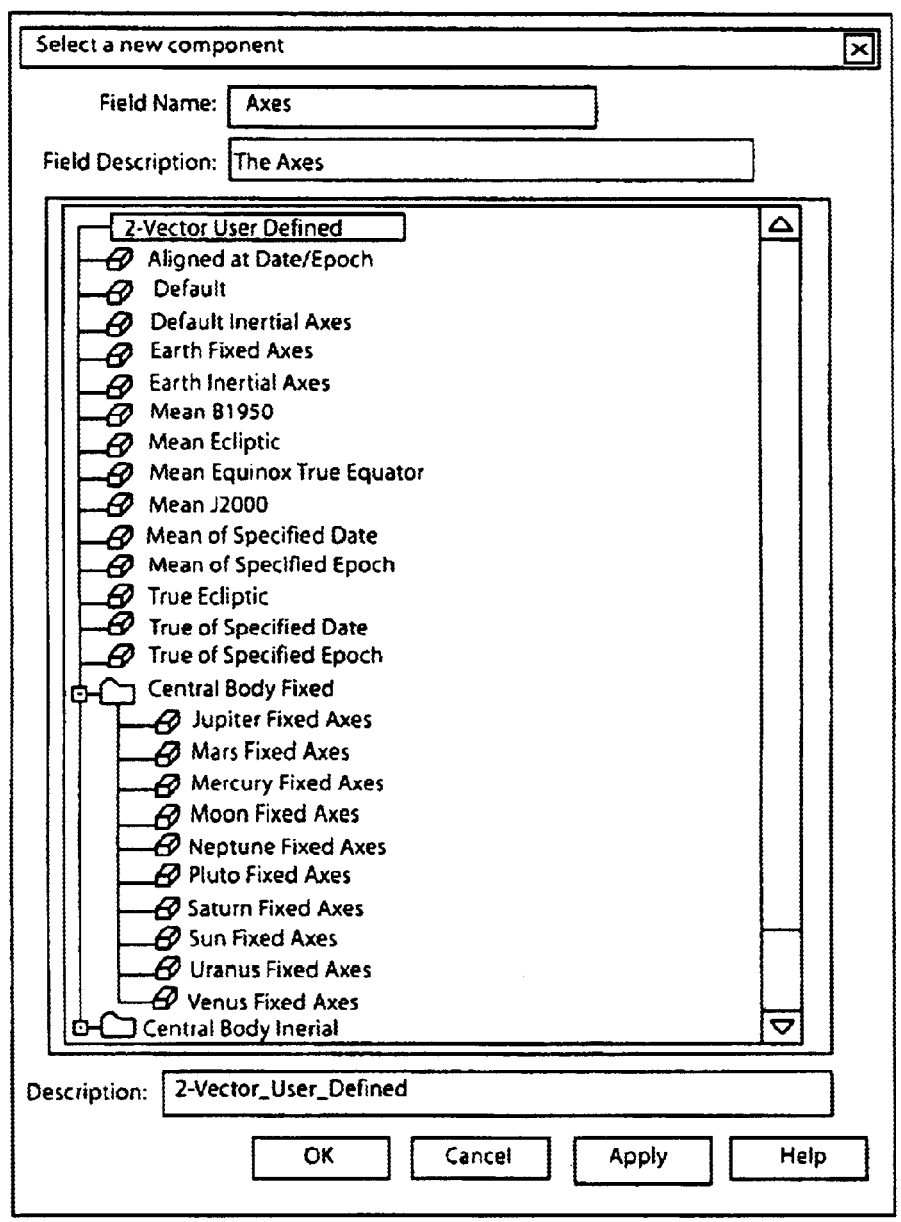
FIG. 6 illustrates further the implementation example of FIG. 5.
Figure 7:
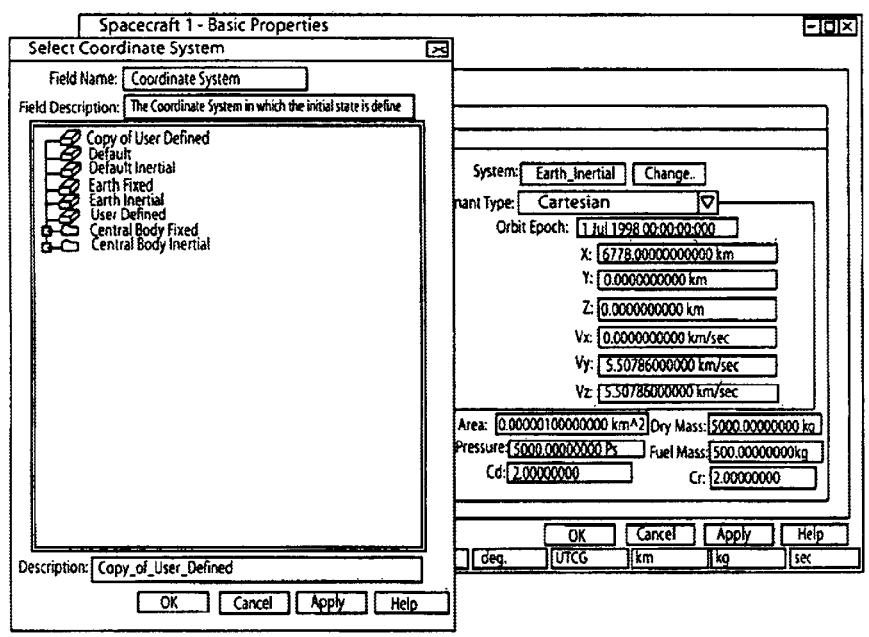
FIG. 7 illustrates further the implementation example of FIG. 5.

Referring to FIGS. 5–7, a simple example is illustrated of an implementation of the invention in the Astrogator program. FIG. 5 shows the Astrogator Component Browser, in which an available coordinate system (User Defined) has been selected and "cloned" (i.e., copied). A dialog box called the Astrogator Component Editor allows components of the copied coordinate system to be changed. For example, if the "Axes" field is selected, the selection window shown in FIG. 6 appears, allowing the user to choose among several alternative sets of axes. Once the new coordinate system is created, it is available in the user interface for all spacecraft mission analysis purposes, such as definition of the initial state of the spacecraft, as shown in FIG. 7.

The system and method of the present invention operates on a number of standard processors known in the art. UNIX processors such as the Silicon Graphics SGI IMPACT™ and SGI 02™ each with the Reality Engine™ or the Infinite Reality™ engine; the IBM RS6000 with Evans & Sutherland Freedom graphics accelerator; the Hewlett Packard™ HP9000™ with Evans & Sutherland graphics accelerator; the Sun Microsystems SPAR™ station with Evans & Sutherland Freedom graphics accelerator; the Sun Microsystems UltraSUN™ with Creator3D graphics hardware; Digital Equipment Corporation 4D50T and 4D60T processors. Microsoft Windows operating system hardware also can be used with the present invention with MS Windows, Windows95/98/2000, and WindowsNT operating systems with or without OpenGL Accelerators. Generally, all of the above systems should also have 48 MB of memory and at least 75 MB of hard drive space available.

A system and method for creating elements and systems for description of position and motion of bodies in three-dimensional space to support orbital maneuver analysis has been disclosed. It will be appreciated by those skilled in the art that other variations may be possible without departing from the scope of the invention as disclosed.

What is claimed is:

1. A method for a spacecraft maneuver analyst to model orbital maneuver phenomena on a computer without needing to hard-code a software solution for new spatial objects, comprising:

defining an original coordinate system within a graphic user interface of said computer;

defining one or more parent spatial objects relative to said original coordinate system by selection of one or more pre-existing files from within said graphic user interface; and creating at least one new spatial object based on said one or more parent spatial objects, comprising:

defining said new spatial object relative to said one or more parent spatial objects, comprising:

finding said new spatial object in each of said one or more parent spatial objects; and performing a building operation to obtain a combined transformation based on said parent spatial objects to create said new spatial object, wherein said one or more parent spatial objects and said at least one new spatial object are related to orbital maneuver phenomena.

2. The method of claim 1, wherein said one or more parent spatial objects and said at least one new spatial object are selected from the group consisting of coordinate systems, coordinate systems primitives, derivatives of coordinate system primitives, and combinations thereof.

3. The method of claim 1, wherein defining said new spatial object relative to said one or more parent spatial objects comprises:

finding said new spatial object in one parent spatial object and using information explicitly provided by said analyst into the graphic user interface to obtain a first transformation;

finding said one parent object in said new spatial object to obtain a second transformation; and combining said first and second transformations to create said new spatial object.

4. The method of claim 1, wherein defining one or more parent spatial objects relative to said original coordinate system is accomplished by user input, file input, or both.

5. The method of claim 1, wherein said original coordinate system is a default within said graphic user interface of said computer.

6. The method of claim 1, wherein said original coordinate system is selectable within said graphic user interface from pre-existing coordinate systems.

7. The method of claim 1, wherein said new spatial object is subsequently reused by said analyst as a parent spatial object to create a different new spatial object.

8. The method of claim 1, wherein a correction to a parent spatial object results in a correction to said new spatial object.

9. A system for a spacecraft maneuver analyst to model orbital maneuver phenomena on a computer system without needing to hard-code a software solution, comprising:

a processor;

a memory, addressable by the processor, including software instructions adapted to enable the computer system to perform the method of claim 1.

* * * * *